(No Model.)

J. CARTER & W. J. WHITING.
REVOLVER.

No. 432,368.

2 Sheets—Sheet 1.

Patented July 15, 1890.

WITNESSES
Henry Cherrett
Miles E. Hughes
Both of Birmingham

INVENTORS
John Carter
William John Whiting (No Model.) 2 Sheets—Sheet 2.
J. CARTER & W. J. WHITING.
REVOLVER.
No. 432,368. Patented July 15, 1890.
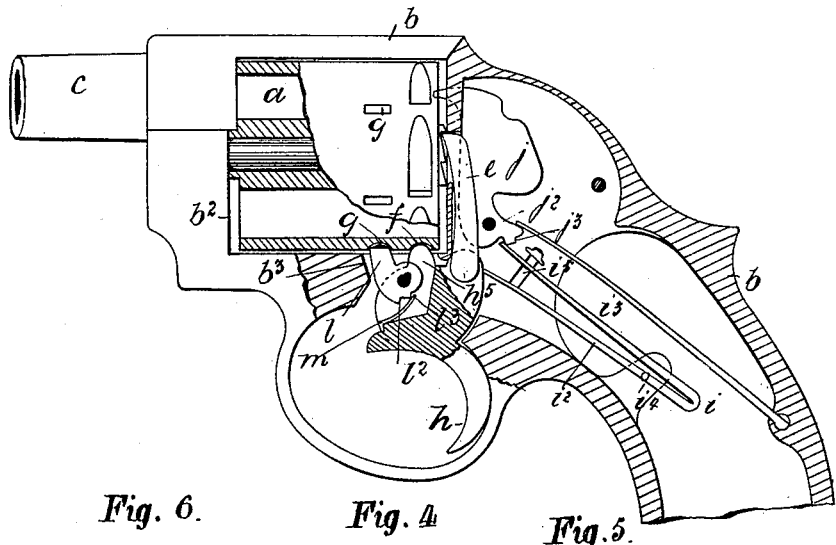
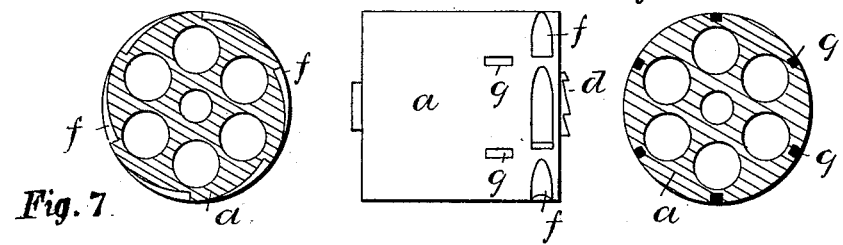
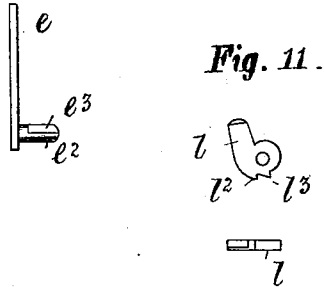
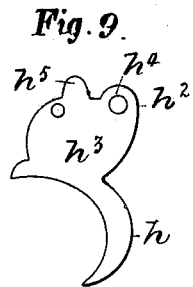
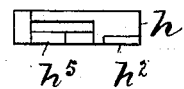
WITNESSES
Henry Sherrett
Miles E. Hughes
Both of Birmingham
INVENTORS
John Carter
William John Whiting
Conwell &co Attys

UNITED STATES PATENT OFFICE.

JOHN CARTER AND WILLIAM JOHN WHITING, OF BIRMINGHAM, ENGLAND, ASSIGNORS TO THOMAS WILLIAM WEBLEY AND HENRY WEBLEY, OF SAME PLACE.

REVOLVER.

SPECIFICATION forming part of Letters Patent No. 432,368, dated July 15, 1890.

Application filed March 14, 1889. Serial No. 303,310. (No model.) Patented in England April 18, 1888, No. 5,778, and in Belgium January 31, 1889, No. 63,294.

*To all whom it may concern:*

Be it known that we, JOHN CARTER and WILLIAM JOHN WHITING, pistol-action filers, subjects of the Queen of Great Britain, residing at Bracebridge Street, Aston juxta, Birmingham, England, have invented certain new and useful Improvements in Revolvers and other Repeater Small-Arms, (for which applications have been made in Great Britain, dated the 18th day of April, 1888, No. 5,778, and in Belgium, dated the 31st day of January, 1889, initial No. 63,294;) and we do hereby declare the following to be a full, clear, and exact description of the invention, reference being had to the accompanying drawings, which form part of this specification.

This invention relates to revolvers and other repeater small-arms, as hereinafter described.

Figure 1:
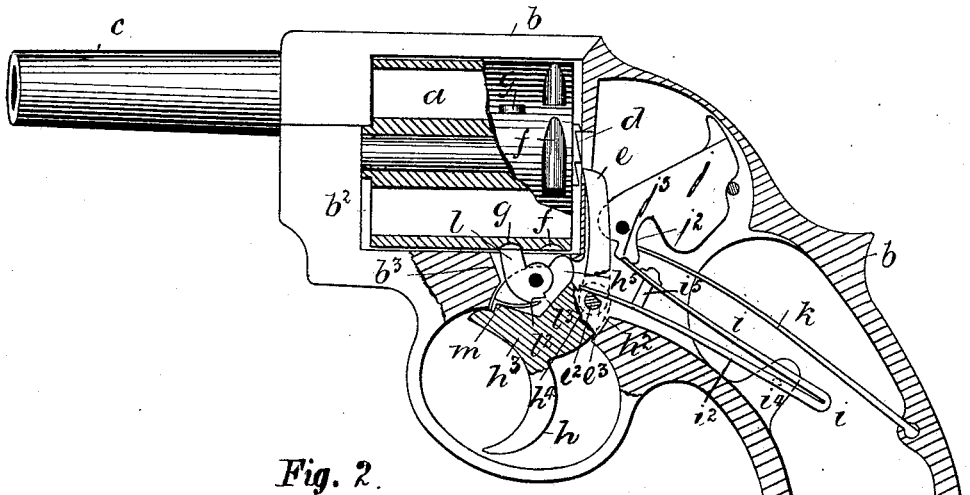
Figure 2:
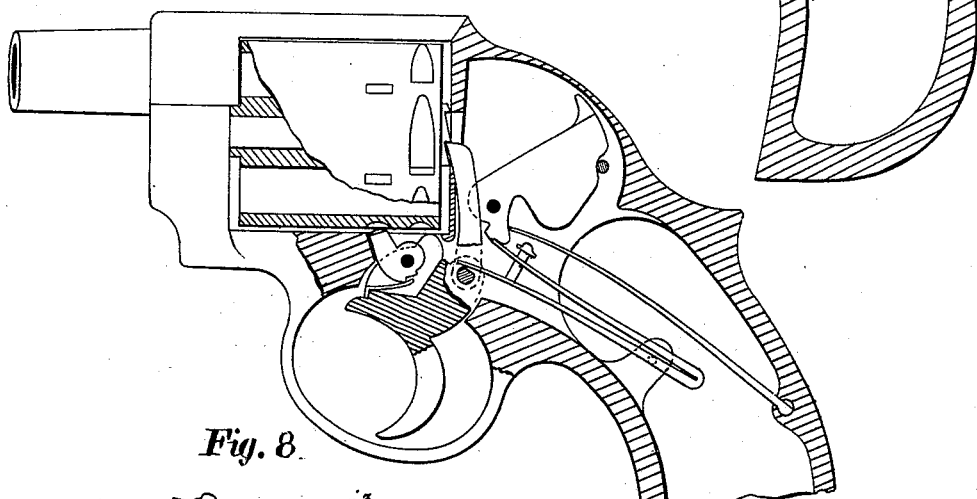
Figure 8:
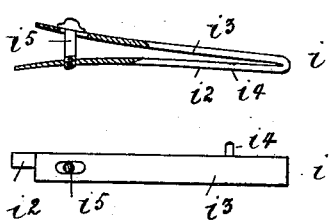

Figure 1 of the accompanying drawings represents, partly in vertical section and partly in elevation, a solid frame revolver constructed and arranged according to our invention. It will be observed that the said arm is provided with a free cylinder, and is shown with the parts in the positions which they respectively assume when it is ready for firing by the pulling of the trigger. Fig. 2 represents a like view as Fig. 1, but with the trigger half-way pulled and the second cylinder-stop removed or out of its holding position, which thus allows the free cylinder to rotate for the bringing of a fresh and undischarged chamber before the nose of the hammer. Fig. 3 shows a like view as Figs. 1 and 2, but with the arm discharged and the trigger fully pulled back into the position which it assumes on firing. It will be observed that both the cylinder-stops are in their holding positions, while the top side free end of the mainspring is holding the hammer forward until the release of the trigger by the removal from it of the finger of the user, when the hammer rebounds and the cylinder is held only by the second stop. Fig. 4 represents in elevation the free cylinder, and Fig. 5 a transverse section thereof, showing the second stop recesses sunken at equal distances apart around the said cylinder. Fig. 6 is a transverse section across the first stop recesses. Fig. 7 is an edge view of the lifter, showing the faceted outstanding limb upon which the stand-side free end of the mainspring takes its bearing. Fig. 8 represents a side elevation, partly in section, and plan of the mainspring. Fig. 9 is an elevation of the trigger, and Fig. 10 a top side plan thereof showing the No. 1 locking-arm and the rear of the blade, to which the lower end of the lifter is jointedly connected, so that by the pulling of the trigger back the free cylinder is allowed to be rotated. Fig. 11 represents an elevation and plan of the second cylinder-stop.

The same letters of reference indicate corresponding parts in Figs. 1 to 11.

$a$ is a chambered and free-working cylinder working within a rectangular-shaped recess $b^2$ of a solid frame $b$, whose fore part is provided with a barrel $c$, whose bore or axis is coincident with the chambers within the said free cylinder when the cylinder is rotated, so as to bring its chambers into position for firing. The chambered cylinder has a centrally-disposed ratchet-faced annulus $d$ at its rear, with which the upper end of a lifter $e$ engages. The said cylinder has double-stop recesses $f$ and $g$. The recess $f$ we designate the "first stop cylinder recess," and the recess $g$ the "second stop cylinder recess." The lower end of the lifter $e$ has a flattened side $e^3$ of a standing-out limb $e^2$, which passes jointedly through a hole at the rear top side $h^2$ of the trigger-blade $h^3$ of the trigger $h$, while the free end lower side $i^2$ of the mainspring $i$ takes its bearing upon the said flattened side of the arm of the lifter. The upper limb $i^3$ of the mainspring nominally takes its bearings upon the under side of the hammer $j$, of which the said under side is formed into an arm $j^2$, with full-cock bent $j^3$ made within it, and wherein the free end of the said limb $i^3$ of the mainspring $i$ engages when the hammer is fully cocked. The approach to the bent resembles in form an inclined plane, so that on forward pressure being applied to the said hammer, as hereinafter described, the said free end is removed. It will be observed that the said mainspring top side limb does duty both as a spring for throwing the hammer and also as a sear for retaining it cocked.

The mainspring rear part is swively connected at $i^4$ to the solid frame, while its front and free ends are stayed by a headed pin $i^5$, fixedly connected at its lower end to the lower limb $i^2$ and with its shank working through a hole made in the upper limb $i^3$, and when the parts of the arm are in their normal positions the under side of the head rests upon the top side of the upper limb, as represented at Fig. 1.

K is a supplementary spring fixedly connected at one end to the framing, while its other end is free and takes its bearing upon the inclined rear part of the arm $j^2$ of the hammer $j$, so that on the stay being elevated on the pulling of the trigger the said free end is lifted or deflected to the under side of the rear of the hammer, which being thereby pressed forward takes the limb $i^3$ of the mainspring out of bent, and so allows the hammer to fall by the force exerted upon it of the said limb acting below the center and upon the short arm $j^2$. It will be observed that the principal office of this said supplementary spring is for giving the rebound movement to the hammer after firing.

The trigger, which consists of a trigger and trigger-blade, and hung upon the center $h^4$, is provided with a fixed and also a movable cylinder-stop $l$.

$h^5$ is the No. 1 cylinder-stop, while $l$ is the movable and No. 2 cylinder-stop. The functions of both stops are to hold the cylinder at two points when the arm is discharged and at one point on the return of the trigger. The No. 2 stop consists of a jointed limb $l$, turning upon the same pin as the trigger, with an abutment $b^3$, against which it comes and rests, on the first pulling of the trigger, and from which it again recedes (to the position as represented in Figs. 1 and 3) when the said trigger is fully pulled home. The under side of the said top has bents or notches cut or made within it, which form shoulders upon which the free end of the flat spring $m$ respectively takes on the trigger changing its position. Thus the initial pull of the trigger carries the stop $l$ with it until its front side abuts and rests upon the stop $b^3$, when the continued movement of the spring $m$, with the trigger, takes its free end from the shoulder $l^2$ to the locking-shoulder $l^3$, which causes the stop to fly from the position Fig. 2 to that of Fig. 3.

The action of the mechanism of the arm is as follows: The initial pulling of the trigger, which is jointed upon the pin $h^4$, turns the part $h^2$ rearwardly and upwardly, thus raising the lifter $e$ and taking the locking-arm $h^5$ up to the entrance of one of the cylinder-recesses $f$, and also at the same time takes $l$ (the No. 2 cylinder-stop) out of one of the cylinder-recesses $g$, so as to leave the cylinder free to move from right to left, which is done by the continued rising of the lifter on the further pulling home of the trigger. For example, at the time when the lifter is elevated, which turns the cylinder round to the extent of a chamber, the No. 1 stop has passed into a No. 1 cylinder-recess, and the No. 2 stop into a No. 2 cylinder-recess, while the stand-side limb of the mainspring, which rests upon the flat of the arm $e^2$ of the lifter $e$, has been raised (top limb remaining quiescent) by the said arm, and with it the stay, whose head is made to impinge upon the under side of the free end of the supplementary and rebound spring, thereby taking it from the incline at the rear of the arm of the tumbler and pressing it against the under side of its haunched back, which gives a forward movement to the hammer and forces the end of the top limb of the mainspring from out of the bent, which is done by an inclined plane or wedge action. Thus on the said end being free of the bent the hammer falls by the force of the said mainspring. The releasing of the trigger causes the free end of the supplementary spring to press upon the inclined rear of the hammer and so give its return movement, while the other parts of the mechanism resume their normal positions, as represented in Fig. 1.

It will be understood that the second cylinder-stop $l$ is operated as follows: On the pulling of the trigger the stop $l$ is carried with it until it comes in contact with the abutment $b^3$, when its progress is arrested, and held there until the free end of the spring $m$ has come upon the locking-shoulder, when the said stop flies back into the position as in Fig. 3, and on the releasing of the trigger the said spring's free end comes upon the neutral shoulder, as in Fig. 1, which holds it in this said position until the trigger is again pulled.

Having thus described our invention, we claim as new and desire to secure by Letters Patent—

1. In a concealed-hammer revolver, the combination, with frame of the revolver and a cylinder revolving therein having recesses $f$ $g$ on its outer surface, of the trigger $h$, provided with the spring $m$, and stops $l$ $h^5$, one of which is integral with the other, pivoted to said trigger, the stop $l$ being formed with the shoulders $l^2$ $l^3$, with which the spring $m$ alternately engages as the trigger is drawn back, thus causing the cylinder to be locked at two points on firing, substantially as described.

2. In a concealed-hammer revolver, the combination, with the frame of the revolver, the cylinder, trigger, and lifter, of the hammer $j$, formed with the arm $j^2$, having the shoulder or notch $j^3$ on its under side and with the gap in its rear edge, the mainspring $i$, whose free end normally takes into said notch, one leaf of said spring being pivoted on a lug in the stock or frame of the revolver, the stay $i^5$, carried by the lower arm of said spring and contracting with the spring K, and the rebound-spring $k$, the said upper or free end of said mainspring serving both as a sear and hammer operating spring, substantially as described.

3. In a concealed-hammer revolver, the combination, with the hammer *j* and the rebound-spring *k*, impinging upon said hammer, of the mainspring *i*, normally locking said hammer, and the stay $i^5$, by which when the trigger is drawn back the rebound-spring is disengaged from the hammer and the mainspring released therefrom, said stay being secured to the lower leaf of the mainspring, and said spring pivoted to a lug on the stock or frame of the revolver, substantially as described.

In testimony that we claim the foregoing we have hereunto set our hands.

JOHN CARTER.
WILLIAM JOHN WHITING.

Witnesses:
HENRY SKERRETT,
MILES E. HUGHES,
*Both of Birmingham.*